United States Patent
Godwin et al.

(10) Patent No.: US 7,581,116 B2
(45) Date of Patent: Aug. 25, 2009

(54) DEVICE CONTROL SUPPORT INFORMATION ACQUISITION

(75) Inventors: Ian Frederick Godwin, Waterlooville (GB); Nicholas Michael O'Rourke, Eastleigh (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 11/015,682

(22) Filed: Dec. 17, 2004

(65) Prior Publication Data

US 2005/0138054 A1    Jun. 23, 2005

(30) Foreign Application Priority Data

Dec. 18, 2003    (GB)    ................... 0329261.2

(51) Int. Cl.
*H04L 9/32*    (2006.01)
*G06F 17/00*    (2006.01)
*G06F 15/16*    (2006.01)
*G06F 15/173*    (2006.01)

(52) U.S. Cl. ................ 713/189; 707/101; 709/203; 709/224

(58) Field of Classification Search ......... 713/182–192; 709/203, 224; 707/101
See application file for complete search history.

(56) References Cited

U.S. PATENT DOCUMENTS

| 7,328,260 | B1* | 2/2008 | Muthiyan et al. | ........... 709/224 |
|---|---|---|---|---|
| 2002/0138608 | A1 | 9/2002 | Canis et al. | |
| 2002/0173997 | A1* | 11/2002 | Menard et al. | ................. 705/7 |
| 2003/0025832 | A1* | 2/2003 | Swart et al. | ................. 348/461 |
| 2003/0110262 | A1 | 6/2003 | Hasan et al. | |
| 2003/0131207 | A1 | 7/2003 | Arakawa et al. | |
| 2003/0145045 | A1* | 7/2003 | Pellegrino et al. | ........... 709/203 |
| 2003/0154177 | A1* | 8/2003 | Holland et al. | ................. 706/60 |
| 2003/0204791 | A1* | 10/2003 | Helgren et al. | ................. 714/48 |
| 2004/0193969 | A1* | 9/2004 | Nemoto et al. | .............. 714/100 |

FOREIGN PATENT DOCUMENTS

EP    1 345 113 A2    9/2003

* cited by examiner

*Primary Examiner*—Kimyen Vu
*Assistant Examiner*—Suman Debnath
(74) *Attorney, Agent, or Firm*—Dillon & Yudell LLP

(57) ABSTRACT

A system, method and computer program for acquiring analyzed device control support information in a field population of distributed devices operable to be connected in a network to a virtualizer has an aggregator adapted to be coupled to said virtualizer. The virtualizer is adapted to be coupled to at least one device in the field population and operable to query device control support data from the device and forward the device control support data to the aggregator; and the aggregator is operable to aggregate device control support data and forward aggregated data. A host is arranged to receive the aggregated data across the network and to analyze the aggregated data to provide analyzed device control support information for the field population of distributed devices.

24 Claims, 2 Drawing Sheets

DEVICE CONTROL SUPPORT INFORMATION ACQUISITION

PRIORITY CLAIM

The application claims the benefit of priority under 35 U.S.C. §119(a) from Great Britain Application No. 0329261.2, entitled, "Device Control Support Information Acquisition," filed on Dec. 18, 2003, which disclosure is incorporated herein by reference.

BACKGROUND OF THE INVENTION

1. Field of the Invention

The present invention relates to the automated extraction, aggregation and analysis of support information for networked devices, and particularly but not exclusively for mass-produced hard disk drive controller devices attached to storage area networks having storage virtualization appliances.

2. Description of the Related Art

In the field of this invention it is known that in today's heterogeneous Storage Area Network (SAN) environment users can connect almost any Fibre-Channel controller device to their SAN and use the storage it is providing. With the advent of virtualization devices, especially symmetric virtualization devices, this storage can be handled in device-agnostic ways using the virtualizer as the central point of control in a SAN.

However, not all devices are supported by every SAN virtualizer and, moreover, every controller device may act in subtly different ways from other controllers in the system. The virtualizer therefore in theory can support any controller device that is presenting storage, but can only use the supported devices and only the commonly-implemented protocols. Any specific controller device may not be configured or optimally configured for use by, or be optimally used by, the virtualizer.

As an example, consider that many different implementations of the Small Computer Serial Interface (SCSI) exist in different devices. Each device supports a slightly different subset of the totality of the SCSI commands that are available in the SCSI command interface. When such devices are in communication with standard hardware and software, it is necessary to limit communication to the intersection of each participant's supported subset of commands. This in turn limits the functionality that is available to the system as a whole, and this is clearly undesirable.

Today there is no easy way to determine exactly what storage controllers a customer is attaching to a virtualizer without market research or other humanly-performed techniques. This being the case, there is no fast, simple way of determining that there is a greater requirement among customers for support of one type of device or additional command subset than there is for support of another device or additional command subset. There is likewise no fast and simple way, in a service call situation, of determining whether the problem has been caused by an attempt to use an unsupported device or an unsupported (or not yet supported) subset of the supported device controls. A need therefore exists for an improved system and method for device control support analysis wherein the above mentioned disadvantages may be alleviated.

SUMMARY OF THE INVENTION

The present invention comprises a method, program and system for acquiring analyzed device control support information in a field population of distributed devices operable to be connected in a network to a virtualizer, comprising: an aggregator adapted to be coupled to said virtualizer; said virtualizer adapted to be coupled to at least one device in said field population and operable to query device control support data from the device and forward said device control support data to said aggregator; and said aggregator being operable to aggregate device control support data and forward aggregated data; wherein a host is arranged to receive said aggregated data across the network and to analyze the aggregated data to provide analyzed device control support information for the field population of distributed devices.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

Figure 1:
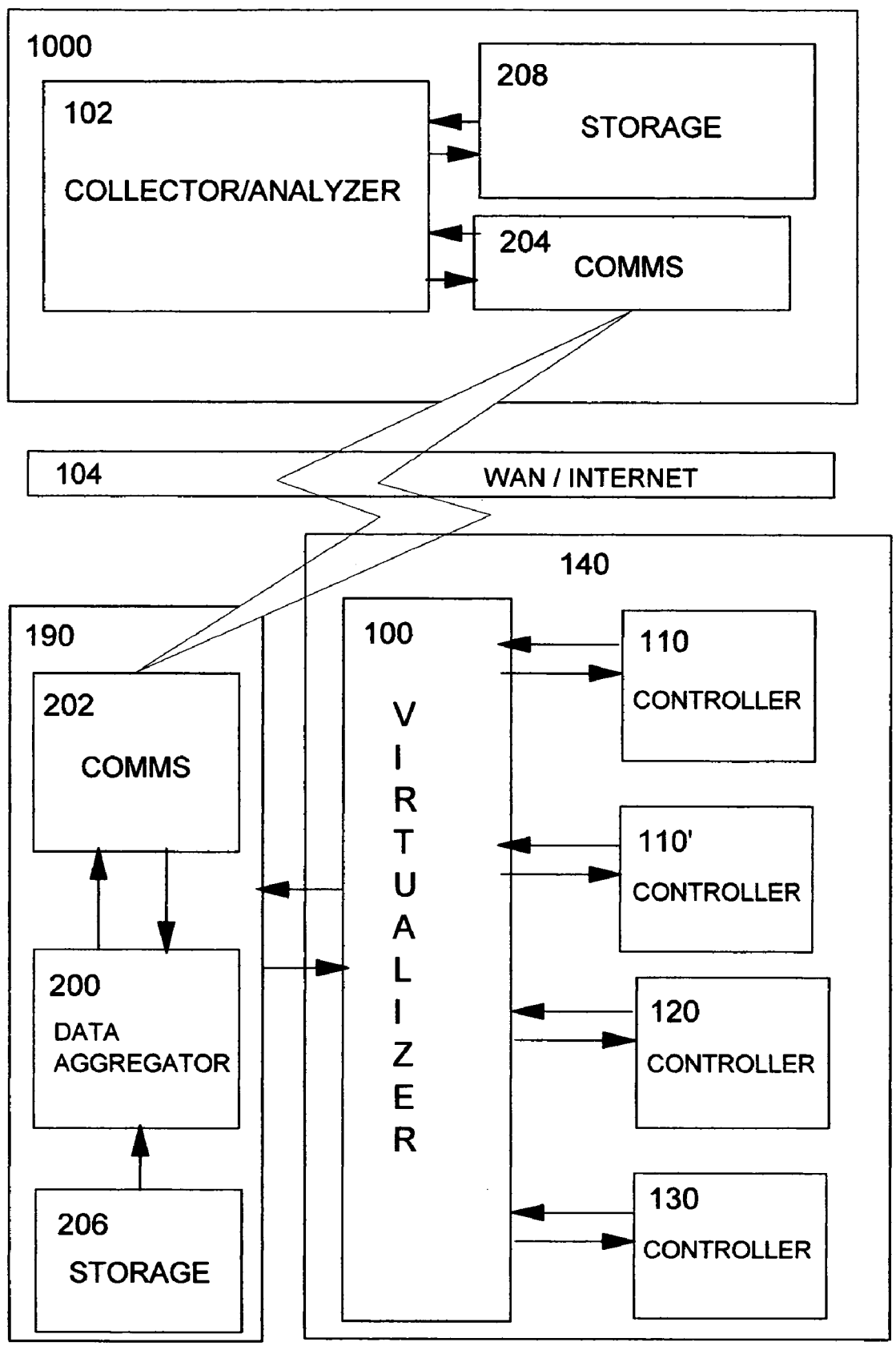
FIG. 1 shows a preferred embodiment of a system in accordance with the invention.

Referring to FIG. 1, there is shown a system 1000 comprising a data collector/analyzer host 102, utilized by a virtualizer vendor in a manner to be further described below, coupled to a Wide Area Network (W2N) 104, which may be, or may comprise, the Internet. The coupling is by means of a communications component 202.

A number of disk drive controllers 110, 110', 120, 130 (manufactured by one or more disk drive controller manufacturers and marketed by one or more vendors, who may themselves be manufacturers also) are operated by a customer, and used to control magnetic disk storage for typical disk drive applications, such as databases, file servers, data storage, paging storage and the like.

The disk drive controllers 110, 110', 120, 130 are mass-produced by the one or more manufacturers, and may be substantially identical to each other, may be variants of a particular family of disk drive controller designs, or may differ in many ways from one another. For example they may support many different configurations of storage and many different subsets of the typical device control commands or APIs. It is envisaged that the manufacturers may produce and the vendors sell many thousands of disk drives and respective controllers of the various families.

The disk drive controllers 110, 110', 120, 130 are attached to a Storage Area Network (SAN) Fabric 140 comprising a virtualizer 100 which in turn is coupled to a SAN management host 190. In an example, disk drive controllers 110, 110' are fully supported, while disk drive controller 120 only supports a restricted subset of device control commands which does not yet meet the supported configuration standard, and disk drive controller 130 is as yet not supported for use in this SAN fabric.

Virtualizer 100 queries the disk drive controllers 110, 110', 120, 130 over the Fibre Channel Fabric to determine their model numbers, their version numbers and their vendors, using commands that are typically supplied as part of a supported command set, such as are commonly published as industry standards. This may be, for example, direct SCSI protocols or, in one alternative, SCSI Enclosure Services (SES) commands.

After scanning the attached Fibre Channel Fabric 140, the data from each of the disk drive controllers 110, 110', 120, 130 is passed to the customer's SAN management host 190, where it is collated or aggregated by aggregator 200 for submission to the vendor of the virtualizer. It is envisaged that, in a most preferred embodiment, this transmission would be by means of an Internet transmission, using, for example HTTP or HTTPS as the protocol. Such protocols advantageously allow the data to pass through intervening firewalls without causing security breaches. If required (and if the customer were to permit it) customer details could also be passed with the data. It would, of course, be necessary to ensure the security of any such sensitive data while in transit, and so some form of encryption or obfuscation may be called for.

Communications component thus sends the aggregated and possibly encrypted and/or compressed information via WAN 104 to a corresponding communications component 204 at vendor's system 1000, which in turn passes the information to the data collector/analyzer host 102. In a preferred embodiment this device support information is temporarily stored in a local database storage 206 on the customer SAN management host 190, and periodically uploaded to the data collector/analyzer host 102 via the WAN 104.

It will be appreciated that the data can be directly uploaded to the data collector/analyzer host 102 as it becomes available. However the use of database storage 206 helps to address the scaling issue as the data collector/analyzer host 102 may be servicing field populations numbering many thousands or millions of individual devices.

Figure 2:
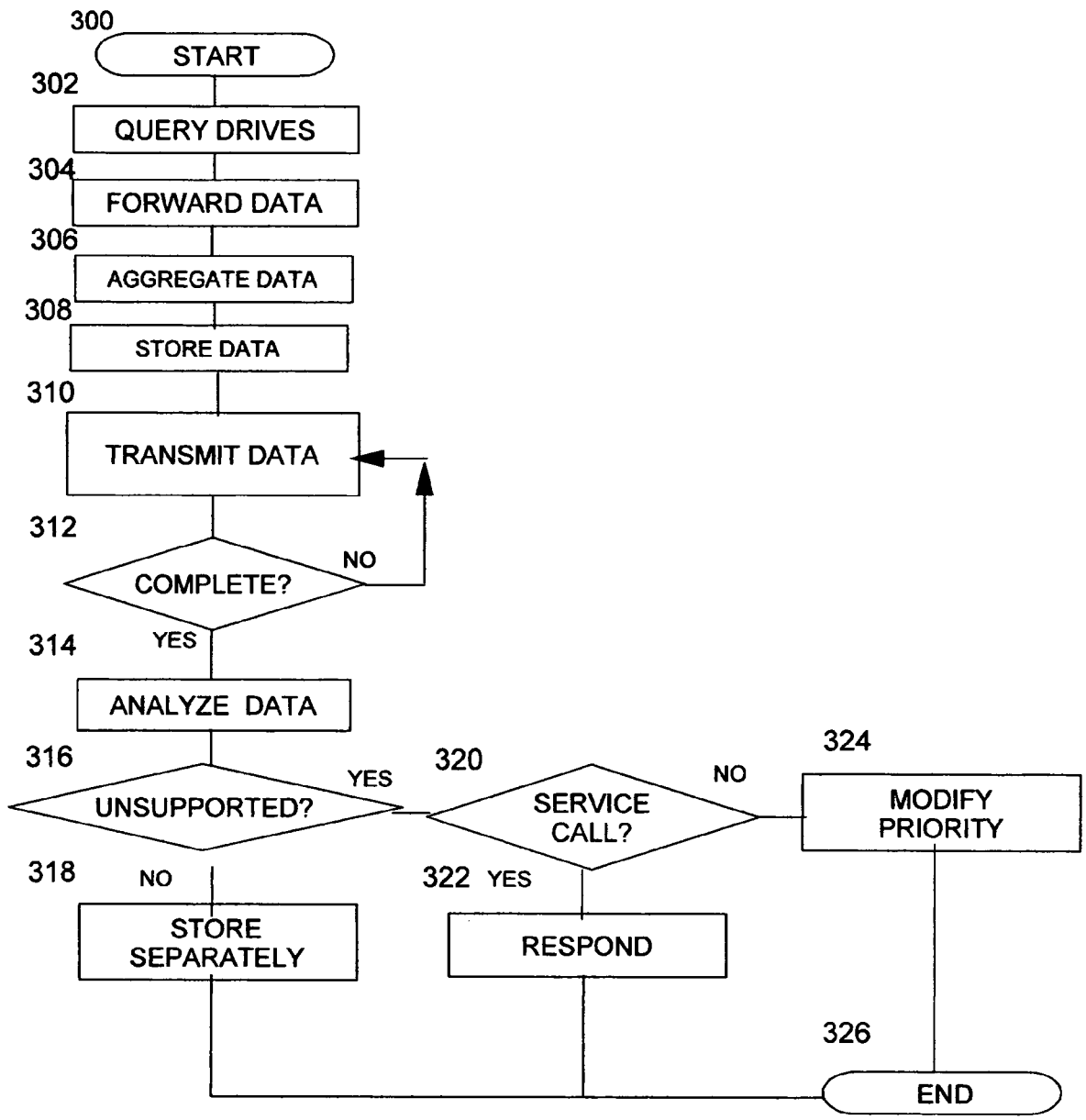
FIG. 2 shows a flow chart of a preferred method of operation of the embodiment of FIG. 1.

A special case may be made for the service call situation, in which a vendor may request that information be sent over the network to indicate the current state of all the disk drive controllers 110, 110', 120, 130 attached to a customer's virtualizer, to determine whether the customer's problem has been caused by attachment of an unsupported disk drive controller 130 or the possible use of an unsupported subset of the device controls by disk drive controller 120. Referring now also to FIG. 2, there is shown an illustrative flow diagram of the operation of a preferred embodiment of the present invention.

At step 300, the process starts, and at step 302, the virtualizer queries the disk drive controller devices for their device characteristics. At step 304, the virtualizer forwards the data to the SAN host, which aggregates it at step 306 and transmits it to the vendor's data collector/analyzer host at step 310. An optional step of storing the data locally may be performed at step 308, in which case transmitting step 310 may be postponed until some suitable later time.

Transmission step 310 continues until completion is received from the vendor's data collector/analyzer host at test 312. On receiving completion from the vendor's data collector/analyzer host at test 312, the SAN host's part of the process is finished. At step 314, the vendor's data collector/analyzer host analyzes the data and then tests at tests 316, 320 and responds to the output in different ways at steps 318, 322, 324.

Responsive to determining at test 316 that the device is supported and optimally configured, step 318 may store the data separately for reference purposes. In an alternative, the data may be discarded, if there is no further use for it.

Responsive to determining at test 316 that the device is either not supported or not optimally configured, test 320 is performed to determine if this data relates to a service call. If so, the data is used at step 322 to respond to the service call.

Responsive to determining at test 320 that this data does not relate to a service call, the data is used at step 324 as input to the vendor's development and test plans to modify the relative priorities of various future device control support requirements. This iteration of the process completes at terminator 326.

Thus, when the device support information reaches the host it is processed and the aggregated results may be used to determine, for example, whether there is a need for a prioritized development effort to support a popular, but presently unsupported device. In an alternative, the aggregated results may be used to determine whether a particular subset of device controls, for example, SCSI commands, needs to be accommodated in the virtualization device, in the attached hosts or in the device controllers. It will be understood that the device, system and method for automatically acquiring and aggregating device control support information described above provides the following advantages:

Recovered information is provided from a large population of drives in the field population, and may be used to perform detailed analysis with greater predictability and less tolerance than present arrangements. Trends may also be detected.

The analysis can advantageously determine if the controllers attached are indeed supported (if for example the customer has put in a service call to the vendor) and validate that a specific controller is not causing the problem, determine the numbers of unsupported controllers in the field-giving advantageous market data relating to the need for the support of hitherto unsupported devices, and, if some threshold has been set, and this is attained for a certain controller type or for a set of supporting commands and responses, the vendor's development and test organizations can be primed to validate the attachment of the specific controller and hence provide improved support particularly to the customer who has installed a heterogeneous group of devices.

It will be appreciated by a person skilled in the art that alternative embodiments to those described above are possible. For example the above invention is applicable to a wide range of mass produced devices which currently are or may be in the future connected to a network including computer tape drives, printers, and the like.

Furthermore it will be understood that the means of exchanging data between the disk drive controllers 110, 110', 120 and 130 and the data collector/analyzer host 102 may differ from that described above. For example for a disk drive controller or virtualizer not coupled to the Internet, removable storage media may be used for the exchange of data.

It will be appreciated by one of ordinary skill in the art that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system RON or fixed disk, or distributed from a server or electronic bulletin board over a network, for example, the Internet or World Wide Web. It will be appreciated that various modifications to the embodiment described above will be apparent to a person of ordinary skill in the art.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A system for acquiring device control support information from a field population of distributed devices, said system comprising:

a data collector/analyzer host coupled to a storage area network (SAN) fabric via a network, wherein said SAN fabric includes a virtualizer connected to a plurality of disk drive controllers;

means for querying and extracting device control support data from said SAN fabric, wherein each subset of said device control support data corresponds to a respective one of said plurality of disk drive controllers;

a storage device for storing said device control support data within said data collector/analyzer host;

means for determining whether or not one of said plurality of disk drive controllers associated with a subset of said device control support data is supported by a vendor of said data collector/analyzer host;

means for, in a determination that said one disk drive controller is not supported by said vendor, determining whether or not said subset of device control support data associated with said one disk drive controller is related to a service call;

means for, in determination that said subset of device control support data associated with said one disk drive controller is related to a service call, utilizing said subset of device control support data to respond to said service call; and means for, in determination that said subset of device control support data associated with said one disk drive controller is not related to a service call, utilizing said subset of device control support data as input to development and test plans of said vendor for modifying future device control support requirements.

2. The system of claim 1, wherein said system further includes a second storage device for, in a determination that said one disk drive controller is supported by said vendor, storing said subset of device control support data associated with said one disk drive controller for reference purposes.

3. The system of claim 1, wherein said plurality of disk drive controllers are manufactured by different vendors.

4. The system of claim 1, wherein said virtualizer is a SAN virtualizer.

5. The system of claim 1, wherein said network is a wide-area network.

6. The system of claim 5, wherein said wide-area network is the Internet.

7. The system of claim 6, wherein said data collector/analyzer host is coupled to said SAN fabric via said network and a SAN management host.

8. The system of claim 1, wherein said device control support data includes at least one of a make and model of each of said disk drive controllers;

a capacity of each of said disk drive controllers; and a command support configuration of each of said disk drive controllers.

9. The system of claim 7, wherein said device control support data is encrypted at a data aggregator within said SAN management host.

10. The system as of claim 7, wherein said device control support data is compressed at a data aggregator within said SAN management host.

11. The system of claim 7, wherein said device control support data is stored in a data aggregator within said SAN management host for periodic forwarding.

12. The system of claim 7, wherein said device control support data is forwarded by a data aggregator within said SAN management host to said data collector/analyzer in response to a service call.

13. A method for acquiring device control support information from a field population of distributed devices said method comprising:

coupling a data collector/analyzer host to a storage area network (SAN) fabric via a network, wherein said SAN fabric includes a virtualizer connected to a plurality of disk drive controllers;

querying and extracting device control support data from said SAN fabric, wherein each subset of said device control support data corresponds to a respective one of said plurality of disk drive controllers;

storing said device control support data within said data collector/analyzer host;

determining whether or not one of said plurality of disk drive controllers associated with a subset of said device control support data is supported by a vendor of said data collector/analyzer host;

in a determination that said one disk drive controller is not supported by said vendor, determining whether or not said subset of device control support data associated with said one disk drive controller is related to a service call;

in determination that said subset of device control support data associated with said one disk drive controller is related to a service call, utilizing said subset of device control support data to respond to said service call; and in determination that said subset of device control support data associated with said one disk drive controller is not related to a service call, utilizing said subset of device control support data as input to development and test plans of said vendor for modifying future device control support requirements.

14. The method of claim 13, wherein said method further includes in a determination that said one disk drive controller is supported by said vendor, storing said subset of device control support data associated with said one disk drive controller in a separate location for reference purposes.

15. The method of claim 13, wherein said plurality of disk drive controllers are manufactured by different vendors.

16. The method of claim 13, wherein said virtualizer is a SAN virtualizer.

17. The method of claim 13, wherein said network is a wide-area network.

18. The method of claim 17, wherein said wide-area network is the Internet.

19. The method of claim 18, wherein said coupling further includes coupling said data collector/analyzer host to said SAN fabric via said network and a SAN management host.

20. The method of claim 13, wherein said device control support data includes at least one of
    a make and model of each of said disk drive controllers;
    a capacity of each of said disk drive controllers; and
    a command support configuration of each of said disk drive controllers.

21. The method of claim 19, wherein said device control support data is encrypted at a data aggregator within said SAN management host.

22. The method of claim 19, wherein said device control support data is compressed at a data aggregator within said SAN management host.

23. A The method of claim 19, wherein said device control support data is stored at a data aggregator within said SAN management host for periodic forwarding.

24. The method of claim 19, wherein said device control support data is forwarded by said a data aggregator within said SAN management host to said data collector/analyzer in response to a service call.

\* \* \* \* \*

UNITED STATES PATENT AND TRADEMARK OFFICE
CERTIFICATE OF CORRECTION

PATENT NO. : 7,581,116 B2  Page 1 of 1
APPLICATION NO. : 11/015682
DATED : August 25, 2009
INVENTOR(S) : Godwin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Fourteenth Day of September, 2010

David J. Kappos
*Director of the United States Patent and Trademark Office*